US010427620B2

(12) United States Patent
Winscher

(10) Patent No.: US 10,427,620 B2
(45) Date of Patent: Oct. 1, 2019

(54) STUMP GRINDER GUARD

(71) Applicant: Travis Winscher, Royalton, MN (US)

(72) Inventor: Travis Winscher, Royalton, MN (US)

(*) Notice: Subject to any disclaimer, the term of this patent is extended or adjusted under 35 U.S.C. 154(b) by 65 days.

(21) Appl. No.: 15/261,043

(22) Filed: Sep. 9, 2016

(65) Prior Publication Data
US 2018/0072233 A1 Mar. 15, 2018

(51) Int. Cl.
B60R 11/06 (2006.01)
A01G 23/06 (2006.01)

(52) U.S. Cl.
CPC ............ B60R 11/06 (2013.01); A01G 23/067 (2013.01)

(58) Field of Classification Search
CPC ............ B60R 9/06; B60R 9/08; A01G 23/067
USPC ..................... 224/40–405; 206/335
See application file for complete search history.

(56) References Cited

U.S. PATENT DOCUMENTS

| 5,392,972 | A | * | 2/1995 | Caruso | B60R 7/02 224/311 |
| 5,927,624 | A | * | 7/1999 | Hughes | B02C 18/067 241/186.4 |
| 6,267,427 | B1 | * | 7/2001 | Ziehl | B60P 7/0892 224/403 |
| 8,160,785 | B2 | | 4/2012 | Kahle et al. | |
| 8,408,258 | B2 | | 4/2013 | Leonardi et al. | |
| 9,114,502 | B2 | | 8/2015 | Brooks et al. | |
| 2003/0071151 | A1 | * | 4/2003 | Gross | A01G 3/002 241/93 |
| 2003/0189074 | A1 | * | 10/2003 | Dise | B60R 9/00 224/404 |
| 2006/0065687 | A1 | * | 3/2006 | Reed | B60P 1/003 224/404 |
| 2006/0108297 | A1 | * | 5/2006 | Gay | B62H 3/04 211/20 |
| 2007/0160452 | A1 | * | 7/2007 | Kerwin | E02F 3/96 414/722 |
| 2007/0166138 | A1 | * | 7/2007 | Brooks | A01D 87/122 414/471 |
| 2009/0107367 | A1 | | 4/2009 | Smythe | |
| 2010/0314001 | A1 | * | 12/2010 | Kappel | A01G 23/067 144/334 |
| 2013/0240086 | A1 | | 9/2013 | Santucci | |
| 2014/0030968 | A1 | | 1/2014 | Brooks et al. | |
| 2014/0183237 | A1 | | 7/2014 | Wolfe et al. | |
| 2014/0271134 | A1 | * | 9/2014 | Le Roy | F01P 11/12 415/119 |
| 2014/0311628 | A1 | | 10/2014 | Miller | |
| 2015/0203051 | A1 | * | 7/2015 | Tofte | B60R 9/10 224/403 |
| 2016/0135388 | A1 | | 5/2016 | Leonardi | |
| 2016/0185305 | A1 | * | 6/2016 | Harrison | B62D 33/0273 224/404 |

(Continued)

Primary Examiner — Derek J Battisti
(74) Attorney, Agent, or Firm — Kinney & Lange, P.A.

(57) ABSTRACT

A support assembly for transporting a stump grinder having a stump grinder wheel includes a base, first and second sidewalls, first and second end-walls, and a channel. The first and second sidewalls are attached to the base and extend perpendicularly upwards from the base. The first and second end-walls are attached to the first and second sidewalls and to the base. The first and second end-walls also extend perpendicularly upwards from the base. The channel is formed between the first and second sidewalls and extends from the first endwall to the second endwall.

18 Claims, 7 Drawing Sheets

(56) References Cited

U.S. PATENT DOCUMENTS

2017/0165674 A1* 6/2017 Harrison ............... A01G 3/002

* cited by examiner

STUMP GRINDER GUARD

BACKGROUND

The present disclosure relates generally to stump grinders, and more particularly to transportation assemblies for stump grinders.

Stump grinders for grinding tree stumps typically include large, heavy grinder wheels attached to large pieces of machinery. During operation, the grinder wheel with grinding teeth is spun at a high rate to cut or abrade pieces of a tree stump still in the ground. During transport of a stump grinder, the typically very heavy stumper grinder wheel can bang around on the bed of the truck or trailer transporting the stump grinder. The relative motion and contact between the grinder wheel and the bed create forces strong enough to damage the wheel or teeth of the stump grinder as well as the bed.

SUMMARY

A support assembly for transporting a stump grinder having a stump grinder wheel includes a base, first and second sidewalls, first and second end-walls, and a channel. The first and second sidewalls are attached to the base and extend perpendicularly upwards from the base. The first and second end-walls are attached to the first and second sidewalls and to the base. The first and second end-walls also extend perpendicularly upwards from the base. The channel is formed between the first and second sidewalls and extends from the first endwall to the second endwall.

A support assembly, which is used for transporting, on a truck or trailer bed, a stump grinder having a stump grinder wheel, includes a base, first and second sidewalls, first and second end-walls, and first and second angled pieces. The base is configured to be fastened to the bed and includes a generally flat plate. The first and second sidewalls are attached to the base and extend perpendicularly upwards from the base. A channel is formed between the first and second sidewalls. The first and second end-walls are attached to the first and second sidewalls and to the base. The first and second end-walls extend perpendicularly to the first and second sidewalls and perpendicularly upwards from the base. The first and second angled pieces are disposed within the channel and form a receiving space for receiving the stump grinder wheel. The receiving space is generally concave in an upwards direction.

DETAILED DESCRIPTION

Figure 1A:
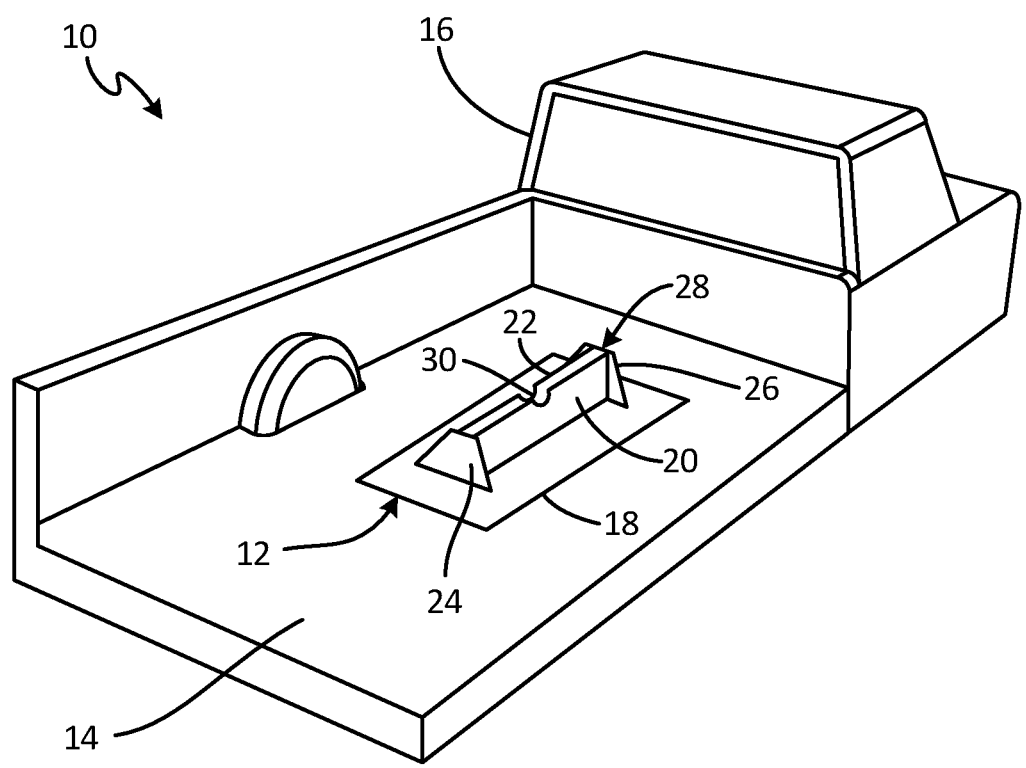
FIG. 1A is a partial perspective view of a support assembly on a truck bed.

FIG. 1A is a partial perspective view of truck 10 with support assembly 12 positioned on bed 14 of truck 10. Truck 10 includes bed 14 and cab 16. Support assembly includes base 18, first sidewall 20, second sidewall 22, first end-wall 24, second end-wall 26, and channel 28. First and second sidewalls 20 and 22 include notches 30. Support assembly 12 with base 18, first sidewall 20, second sidewall 22, first end-wall 24, second end-wall 26, and channel 28 can include materials suited for high-impact resistance including metals such as aluminum, steel, metallic alloys, or composite materials.

Base 18 is attached to bed 14 of truck 10. Base 18 can be mechanically or chemically attached to bed 14. For example, base 18 can be attached to truck 10 with fasteners such as U-clamps, nuts, bolts, washers, and other types of mechanical fasteners. In one non-limiting example, U-bolts with nuts and washers are used to attach base 18 of support assembly 12 to bed 14 are U-bolts with nuts. In other non-limiting examples, base 18 can be attached to truck 10 by welding, adhesion, or other types of chemical attachment. Base 18 can also be integrally formed as part of bed 14.

First and second sidewalls 20 and 22 are attached to base 18 and first and second end-walls 24 and 26. First and second sidewalls 20 and 22 extend perpendicularly upwards from base 18. First and second end-walls 24 and 26 are attached to first and second sidewalls 20 and 22 and to the base. First and second end-walls 24 and 26 extend perpendicular to first and second sidewalls 20 and 22 and also perpendicularly upwards from base 18. First and second end-walls 24 and 26 are positioned at ends of first and second sidewalls 20 and 22 to form and enclose channel 28.

Channel 28 is positioned between first and second sidewalls 20 and 22 and forms an elongated receiving space to receive a flat, circular, and disk shaped stump grinder wheel. In one non-limiting example, base 18, first and second sidewalls 20 and 22, and first and second sidewalls 24 and 26 are attached by welding, but can also be attached through other various mechanical or chemical means of attachment such as U-clamps, nuts, bolts, washers, welding, and/or adhesion. Channel 28 of support assembly 12 is shaped to receive a stump grinder wheel of a stump grinder.

First sidewall 20 and second sidewall 22 can include notches 30, which are shown as arcuate cutouts from first and second sidewalls 20 and 22. In one non-limiting embodiment, a shape of notches 30 includes a partial circle, but can also include non-circular shapes such as a triangle, rectangle, or other geometric shaped cutouts. In general, the shapes of notches 30 are configured to receive an axle or hub of the stump grinder wheel. Notches 30 are located in first and second sidewalls 20 and 22 so as to receive the axle or hub of the stump grinder wheel as the stump grinder wheel is inserted and lowered into channel 28. Notches 30 then cradle the axle or hub of the stump grinder wheel to inhibit longitudinal movement (front to back of truck 10).

In preparation for transportation of the stump grinder, the stump grinder wheel is lowered into channel 28 to place a portion of the stump grinder wheel into support assembly 12. Support assembly 12 creates a guard for supporting, housing, encasing, and/or containing a portion of the stump grinder wheel to limit the stump grinder wheel from lateral and longitudinal movement during transport of the stump grinder, as well as absorbing forces from vertical movement. Lateral movement of the stump grinder wheel positioned in support assembly 12 is prevented by first and second sidewalls 20 and 22, while longitudinal movement is prevented by first and second end-walls 24 and 26 as well as by notches 30. Forces from vertical movement of the stump grinder wheel are absorbed by base 18. In this non-limiting example, support assembly 12 is located in bed 14 of truck 10 for receiving a stump grinder wheel from a stump grinder that can be positioned itself on bed 14 of truck 10 or alternatively on a trailer attached to truck 10.

Storing the stump grinder wheel in support assembly 10 during transport minimizes movement of the stump grinder wheel. Base 18, first and second sidewalls 20 and 22, and first and second end-walls 24 and 26 form a cradle for holding the stump grinder wheel in place by providing a slot for holding the stump grinder wheel during transportation. When the stump grinder wheel experiences lateral forces (side to side relative to truck 10), the stump grinder wheel comes into contact with first sidewall 20 or second sidewall 22 which stop the stump grinder wheel's lateral motion. When the stump grinder wheel experiences longitudinal forces (forward to back relative to truck 10), the stump grinder wheel comes into contact with first end-wall 24 or second end-wall 26 which stop the stump grinder wheel's lateral motion. In addition to the first and second end-walls 24 and 26, notches 30 also inhibit longitudinal motion of the stump grinder wheel by limiting movement of the axle or hub of the stump grinder wheel. Support assembly 12 minimizes the movement of the stump grinder wheel during transport, reduces the forces absorbed by bed 14 from the stump grinder wheel, and prevents damage to both the stump grinder wheel and bed 14.

Figure 1B:
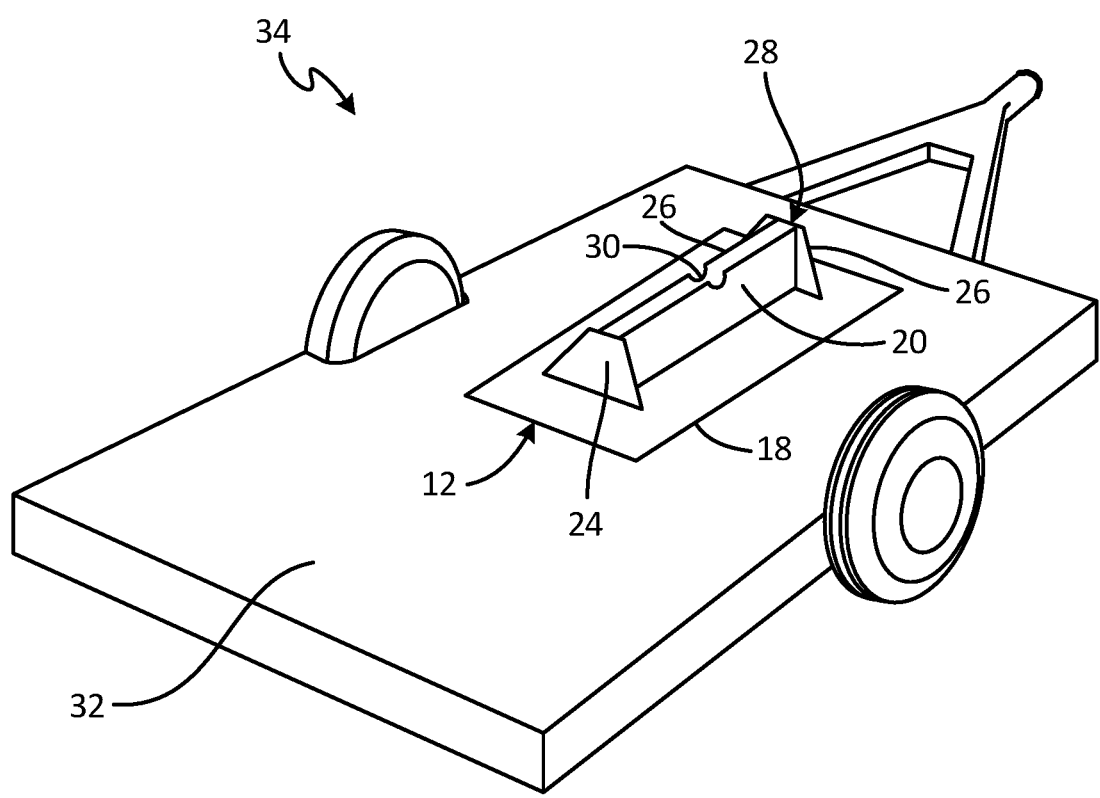
FIG. 1B is a perspective view of a support assembly on a trailer bed.

FIG. 1B is a perspective view of support assembly 12 on bed 32 of trailer 34. Trailer 34 includes an example of a trailer that attaches to a trailer hitch of a motor vehicle. Support assembly 12 positioned on trailer 34 can receive a stump grinder wheel of a stump grinder that is positioned on either a bed of a truck or also placed on bed 32 of trailer 34.

Figure 2:
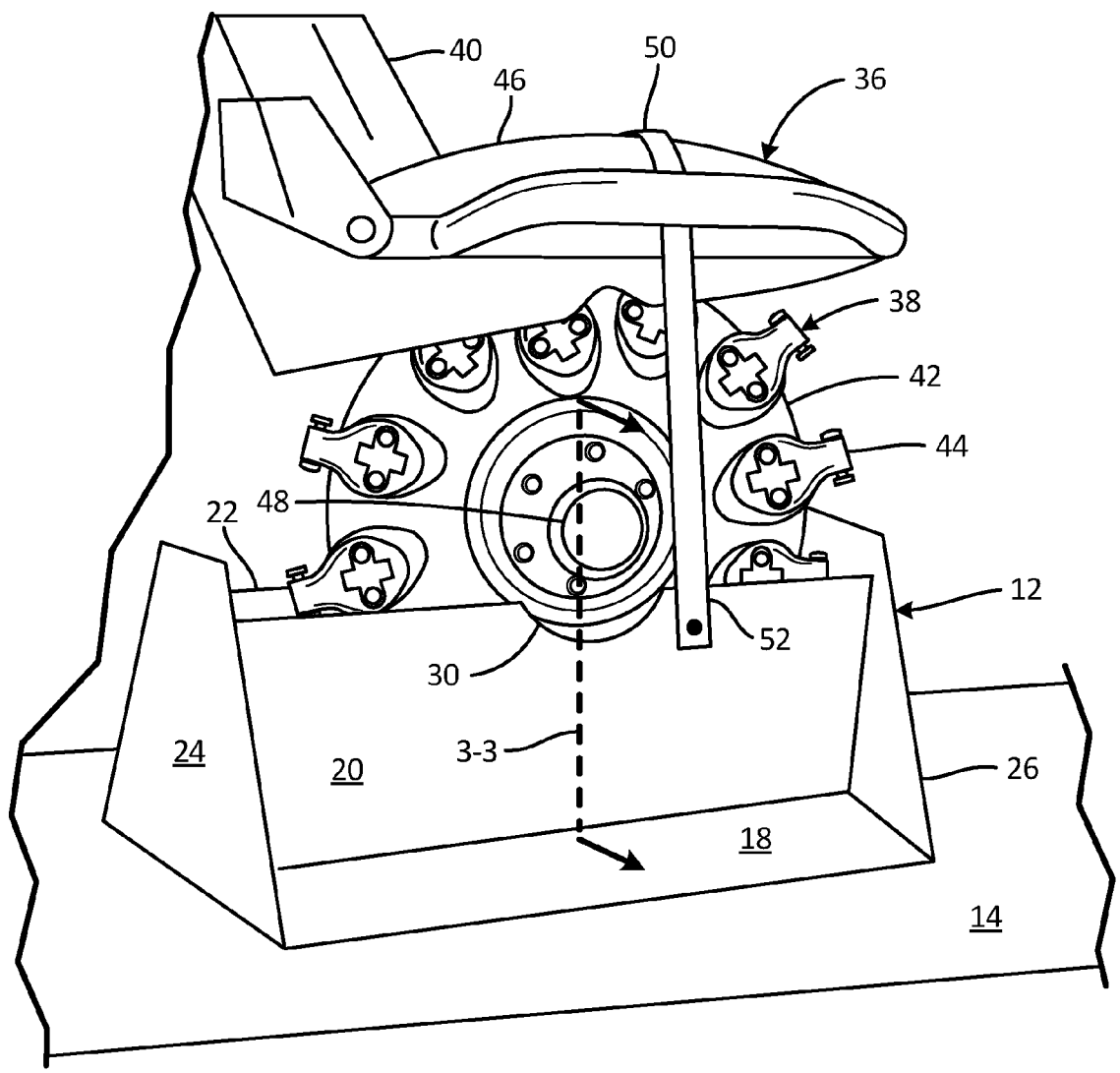
FIG. 2 is a partial perspective view of a stump grinder wheel placed in the support assembly.

FIG. 2 is a partial perspective view of stump grinder 36 with stump grinder wheel 38 placed in support assembly 12 positioned on bed 32 of trailer 34. Support assembly 12 of FIG. 2 includes base 18, first sidewall 20, second sidewall 22, first end-wall 24, second end-wall 26, and channel 28. First and second sidewalls 20 and 22 include notches 30. A portion of stump grinder 36 includes stump grinder wheel 38 and stump grinder arm 40. Stump grinder wheel 38 includes disk 42 and teeth 44. Stump grinder arm 40 includes covering 46 and axle 48. Support assembly 12 additionally includes securing device 50 with first end 52 and second end 54.

Stump grinder 36 includes a grinding apparatus for grinding tree stumps. Stump grinder wheel 38 includes a wheel of solid material. Stump grinder arm 40 includes a movable extension arm for attaching stump grinder wheel 38 to stump grinder 36. Disk 42 includes a flat and thin circular disk of solid material. Teeth 44 include sharp or pointed pieces of solid material that extend radially outward from disk 42. Covering 46 includes a solid sheet of material formed to include a generally arcuate shape. Axle 48 includes a solid rod of material around which disk 42 rotates.

Securing device 50 includes an elongate piece of material with first end 52 and second end 54. Securing device 50 can include stiff or pliable materials such as chain metal, leather, plastic, or other materials generally capable of sustaining large tensile shock loads without breaking. Securing device 50 includes a device connected to first and second sidewalls 20 and 22 that extends around the top of a portion of stump grinder arm 40. Securing device 50 includes first end 52 fastened to first sidewall 20 and second end 54 (not shown in FIG. 2) fastened to second sidewall 22. Securing device 50 can be secured or fastened to first and second sidewalls 20 and 22 by mechanical fasteners or other types of detachment/attachment means. In other non-limiting embodiments, securing device 50 can be attached to any other portion or component(s) of support assembly 12, truck 10, or trailer 34 such as to first and second end-walls 24 and 26, to bed 32 of trailer 34, or bed 14 of truck 10.

Stump grinder wheel 38 is rotatably attached to axle 48. Axle 48 is physically connected to a portion of covering 46. Teeth 44 are attached to stump grinder wheel along an outer edge of stump grinder wheel 38. During operation, stumper grinder wheel 36 revolves upon axle 48 causing teeth 44 to spin at a rate of speed in order to abrade a surface that teeth 44 come into contact with, for example a tree stump.

In FIG. 2, stump grinder wheel 38 of stump grinder 36 has been lowered into and received by the receiving space of channel 28 formed between first and second sidewalls 20 and 22 and first and second end-walls 24 and 26. Stump grinder wheel 38 has been lowered into support assembly 16 such that a bottom of stump grinder wheel 38 is resting upon base 18 or, as discussed further with respect to FIG. 3, upon slanted surfaces within channel 28 that fully or partially conform to the generally circular shape of stump grinder wheel 38 such as a generally concave configuration in an upwards direction.

Securing device 50 secures stump grinder wheel 38 to support assembly 12 during transport of stump grinder 36. Securing device 50 of support assembly 12 minimizes relative motion between stump grinder wheel 38 and support assembly 12 by holding stump grinder wheel 38 into contact with support assembly 12 (such as for example into contact with liner 60 shown in FIG. 3). Minimizing the relative motion between stump grinder wheel 38 and support assembly 12 reduces the forces absorbed by support assembly 12 which reduces or eliminates the damage to bed 14 of truck 10, or alternatively bed 32 of trailer 34, caused by stump grinder wheel 38 with teeth 44 bouncing around during transport of stump grinder 36.

Figure 3:
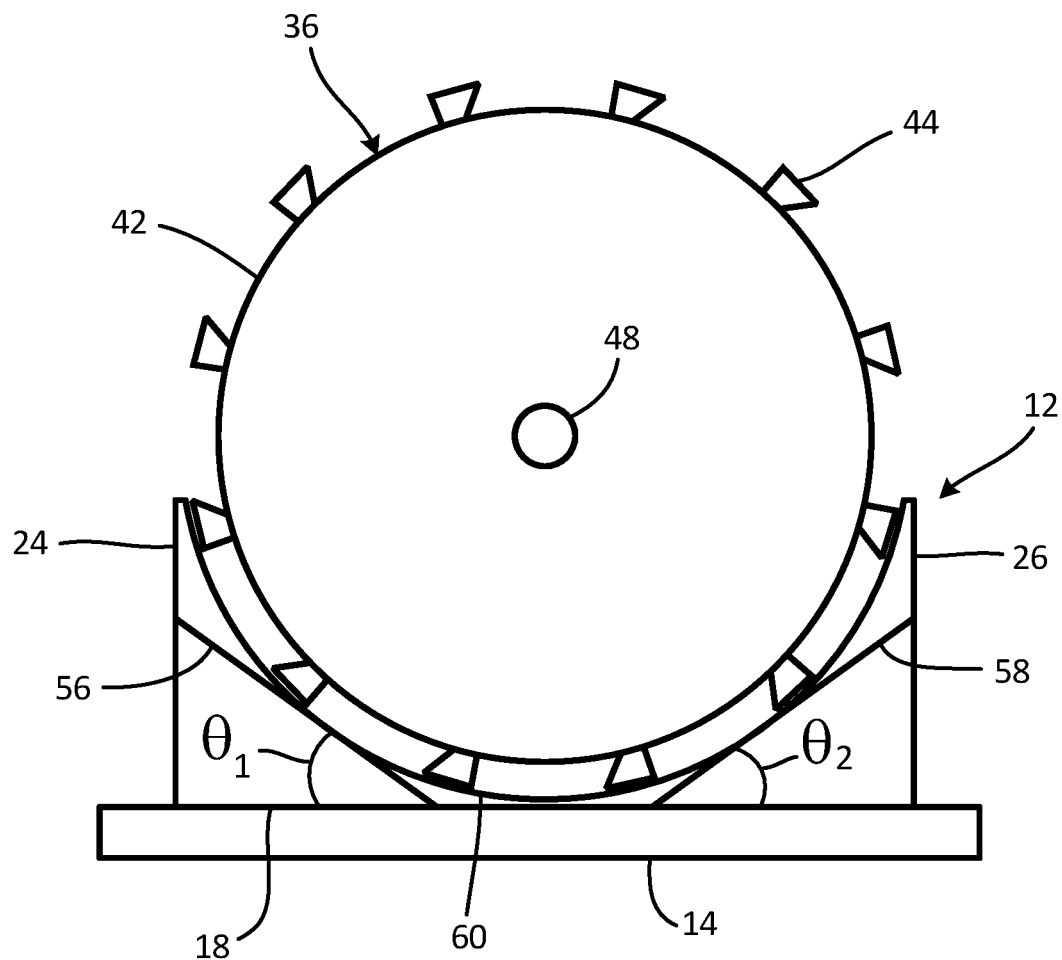
FIG. 3 is a cross-sectional view taken along 3-3 in FIG. 2 of the stump grinder wheel placed in the support assembly.

FIG. 3 is a cross-sectional view of stump grinder wheel 38 placed in support assembly 12 taken along line 3-3 in FIG. 2. As can be seen in FIG. 3, support assembly 12 further includes first angled piece 56, second angled piece 58, and liner 60.

First angled piece 56 and second angled piece 58 include flat plates of solid material. Liner 60 includes a curved elongate piece of resilient, shock-absorbing, or cushioning material which may include natural rubber, synthetic rubber, or other materials.

First and second angled pieces 56 and 58 are disposed in channel 28 between first and second sidewalls 20 and 22. First and second angled pieces 56 and 58 are connected to at least one of base 18, first and second sidewalls 20 and 22, and first and second end-walls 24 and 26 through mechanical or chemical attachment such as welding. First and second angled pieces 56 and 58 form a receiving space that is generally concave in an upwards direction for receiving stump grinder wheel 38. In one non-limiting embodiment, first and second angled pieces 56 and 58 are welded to first and second sidewalls 20 and 22 and to base 18. In another non-limiting embodiment, first and second sidewalls 20 and 22 are welded to base 18 and to first and second end-walls 24 and 26 and first and second end-walls 24 and 26 are welded to base 18 and to first and second sidewalls 20 and 22.

First angled piece 56 forms first angle $\theta_1$ with base 18 and second angled piece 58 forms second angle $\theta_2$ with base 18. First and second angles $\theta_1$ and $\theta_2$ include an angle greater than 0°. In one non-limiting embodiment, first and second angles $\theta_1$ and $\theta_2$ include an angle of 30°-60°, and more specifically 40°-50°.

Liner 60 is disposed in channel 28 and is positioned above first and second angled pieces 56 and 58. Liner 60 includes a generally concave shape to conform to the generally circular shape of stump grinder wheel 38. In other non-limiting embodiments, liner 60 can include other shapes or features for engaging with stump grinder wheel 38 with teeth 44 to aide in the support of stump grinder wheel 38. For example, liner 60 can extend around a portion or the entirety of stump grinder wheel 38 so as to prevent damage from teeth 44 during transport of stump grinder 36.

First angled piece 56 and second angled piece 58 provide a cradle for stump grinder wheel 38 to rest in during transport of stump grinder 36. With the weight of stump grinder wheel 38 resting in support assembly 12, first and second angled pieces 56 and 58 bias stump grinder wheel 38 to rest in between first and second angled pieces 56 and 58 due to a generally concave up configuration of first and second angled pieces 56 and 58. During transport of stump grinder 36, if stump grinder wheel 38 is jolted towards cab 16 of truck 10, stump grinder wheel 38 comes into contact with second angled piece 58 therefore preventing forward longitudinal movement of stump grinder wheel 38 relative to truck 10. Conversely, if stump grinder wheel 38 is jolted backward relative to truck 10, stump grinder wheel 38 comes into contact with first angled piece 56 therefore preventing backward longitudinal movement of stump grinder wheel 38 relative to truck 10.

The welding of first and second angled pieces 56 and 58 to first and second sidewalls 20 and 22, to first and second end-walls 24 and 26, and to base 18 connects support assembly 12 together and provides structural support to support assembly 12 as well. First and second angled pieces 56 and 58 prevent first and second sidewalls 20 and 22 from sinking into each other as well as preventing first and second sidewalls 20 and 22 from separating apart from each other. First and second angled pieces 56 and 58 also strengthen the structure of supply assembly 12 by acting as trusses or braces between first and second sidewalls 20 and 22, first and second end-walls 24 and 26, and base 18.

Liner 60 absorbs forces from teeth 44 of stump grinder wheel 38 caused by relative lateral, longitudinal, and vertical motion between stump grinder wheel 38 and support assembly 12. Liner 60 can also include a non-skid surface for providing additional reduction of relative motion between stump grinder wheel 38 and support assembly 12. In other non-limiting embodiments, all of the surfaces of base 18, first and second sidewalls 20 and 22, and first and second end-walls 24 and 26 can include liner layers for force absorption caused by stump grinder wheel 38 or other components during transport of stump grinder wheel 34.

Figure 4A:
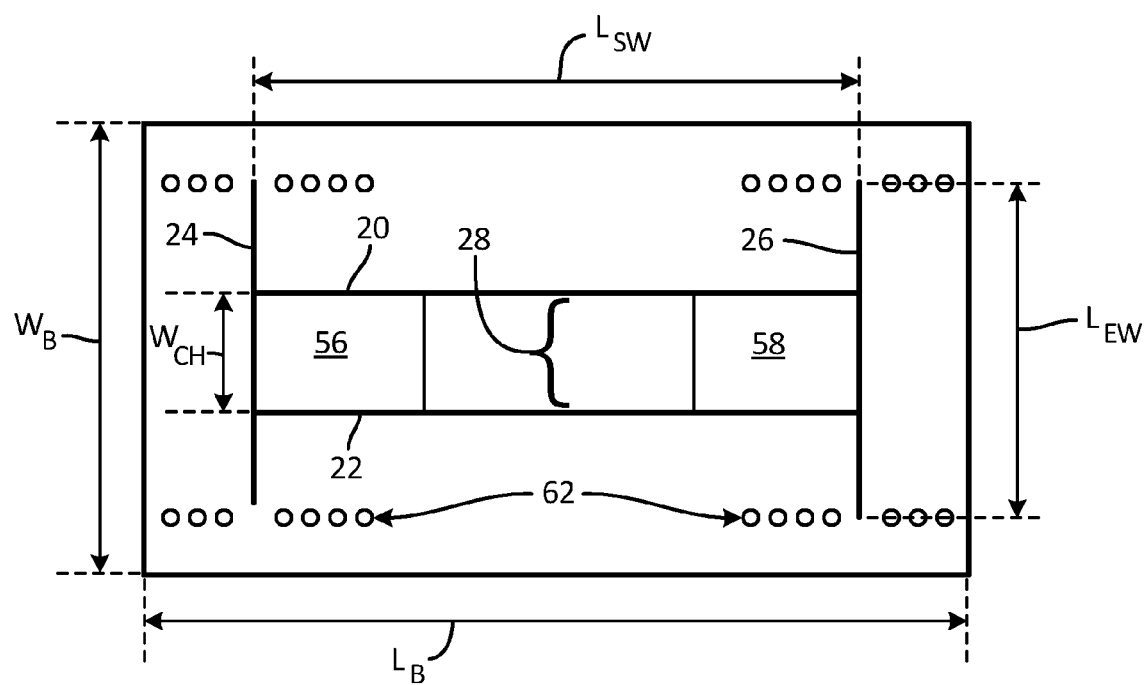
FIG. 4A is a top plan view of a base of the support assembly.

FIG. 4A is a top plan view of base 18, first and second sidewalls 20 and 22, first and second end-walls 24 and 26, channel 28 of support assembly 12, and holes 62.

Base 18 includes length $L_B$ and width $W_B$. First and second sidewalls 20 and 22 include length $L_{SW}$. First and second end-walls 24 and 26 include length $L_{EW}$. Channel 28 includes width $W_{CH}$. In one non-limiting embodiment, length $L_B$ includes approximately 30 inches (76.2 centimeters), width $W_B$ includes approximately 16 inches (40.6 centimeters), length $L_{SW}$ includes approximately 22 inches (55.9 centimeters), length $L_{EW}$ includes approximately 14 inches (35.6 centimeters), and width $W_{CH}$ includes approximately 4 inches (10.2 centimeters).

Base 18 includes holes 62. Holes 62 include an array of holes allowing for mechanical fasteners to insert through base 18 and engage with truck 10 or trailer 34. The array of holes 62 allows for multiple mounting positions of base 18 relative to truck 10 or trailer 34. The flexibility in attachment location of base 18 relative to truck 10 or trailer 34 allows base 18 to be attached in different positions, rotations, and to different sized or configured motor vehicles.

Figure 4B:
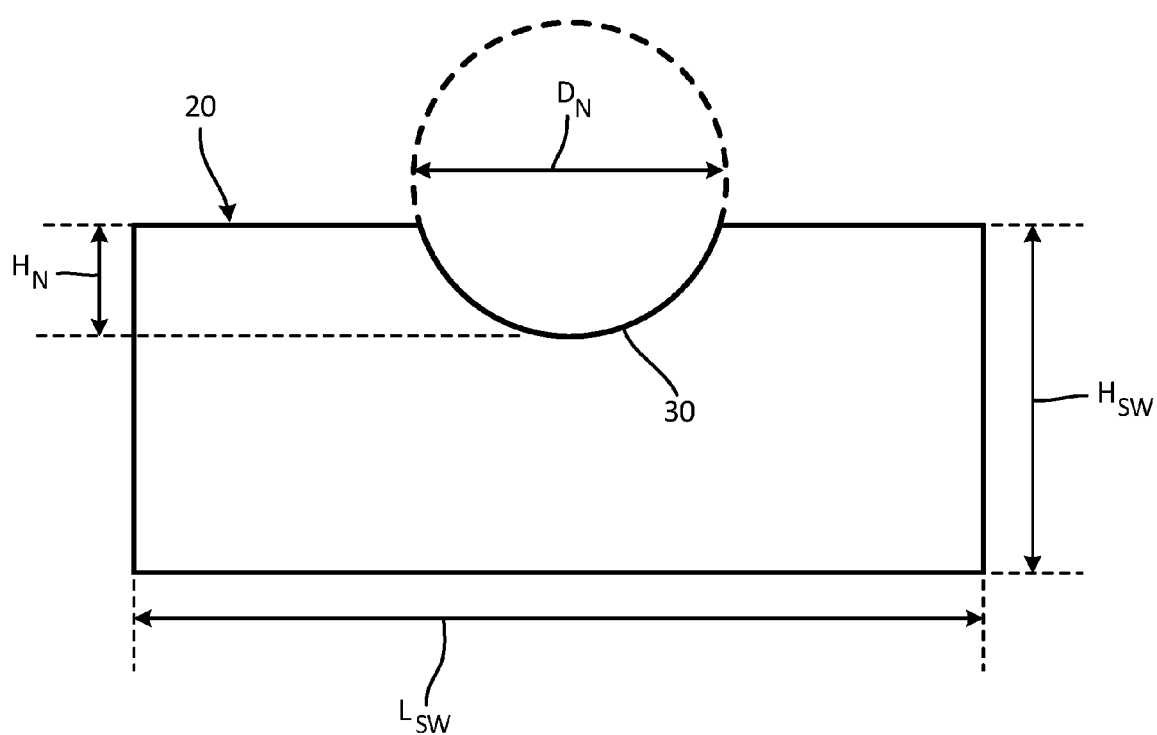
FIG. 4B is a side elevation view of a sidewall of the support assembly.

FIG. 4B is a side elevation view of first sidewall 20 of support assembly 12. First sidewall 20 includes length $L_{SW}$ and height $H_{SW}$. Notch 30 of first sidewall 20 includes height $H_N$ and diameter $D_N$. In one non-limiting embodiment, length $L_{SW}$ includes approximately 22 inches (55.9 centimeters), height $H_{SW}$ includes approximately 9 inches (22.9 centimeters), height $H_N$ includes approximately 3 inches (7.6 centimeters), and diameter $D_N$ includes approximately 8 inches (20.3 centimeters). Length $L_{SW}$ and height $H_{SW}$ can also be representative of a length and height of second sidewall 22.

Figure 4C:
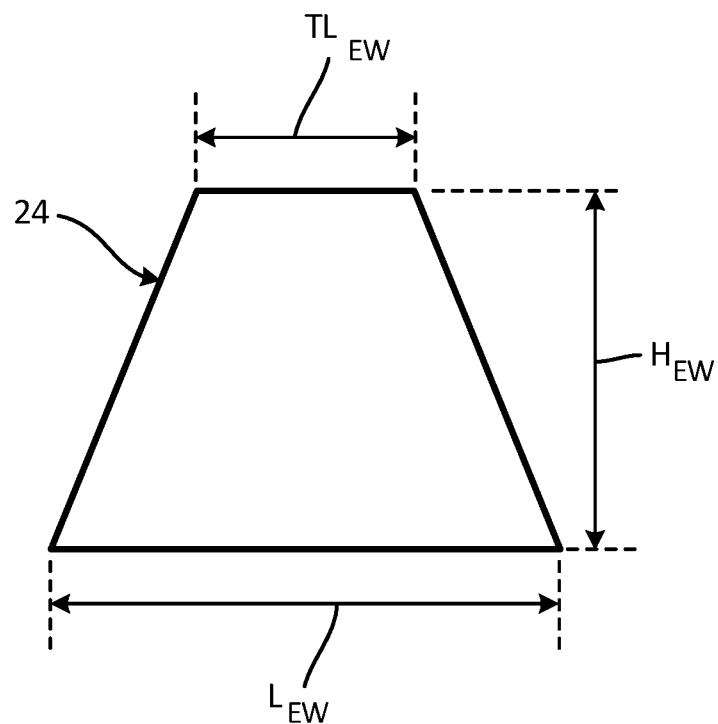
FIG. 4C is a rear elevation view of an endwall of the support assembly.

FIG. 4C is a rear elevation view of first endwall 24 of support assembly 12. First endwall 24 includes length $L_{EW}$, height $H_{EW}$, and top length $TL_{EW}$. In one non-limiting embodiment, length $L_{EW}$ includes approximately 14 inches (35.6 centimeters), height $H_{EW}$ includes approximately 10 inches (25.4 centimeters), and top length $TL_{EW}$ includes approximately 6 inches (15.2 centimeters). Length $L_{EW}$, height $H_{EW}$, and top length $TL_{EW}$ can also be representative of a length, height, and top length of second endwall 26.

Figure 4D:
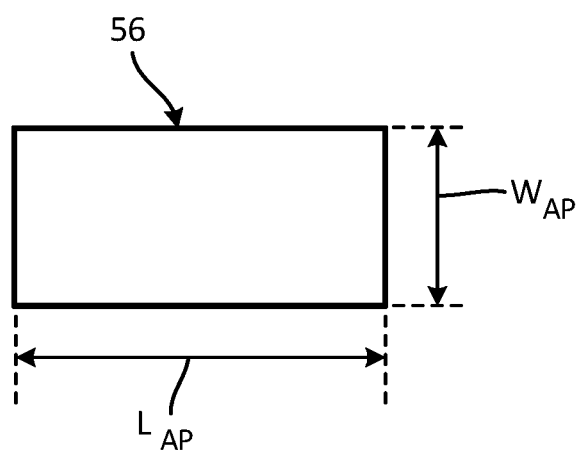
FIG. 4D is a plan view of an angled portion of the support assembly.

FIG. 4D is a plan view of first angled portion 56 of support assembly 12. First angled portion 56 includes length $L_{AP}$ and width $W_{AP}$. In one non-limiting embodiment, length $L_{AP}$ includes approximately 8.5 inches (21.6 centimeters) and width $W_{AP}$ includes approximately 4 inches (10.2 centimeters). Length $L_{AP}$ and width $W_{AP}$ can also be representative of a length and height of second angled portion 58.

While the invention has been described with reference to an exemplary embodiment(s), it will be understood by those skilled in the art that various changes may be made and equivalents may be substituted for elements thereof without departing from the scope of the invention. For example, support assembly 12 can be used for supporting any sort of blade or disk with teeth or a cutting edge for transport in, on, or while connected to a truck. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A support assembly for transporting, with a motor vehicle, a stump grinder having a stump grinder wheel, the support assembly comprising:
   a base, wherein the support assembly is not mounted to the stump grinder;
   first and second sidewalls attached to the base, the first and second sidewalls extending perpendicularly upwards from the base;
   first and second end-walls attached to the first and second sidewalls and to the base, wherein the first and second end-walls extend perpendicularly upwards from the base;
   a channel formed between the first and second sidewalls, the channel extending from the first end-wall to the second end-wall, wherein the channel forms an elongated receiving space that is configured to receive a circular disk shape of the stump grinder wheel;

a liner disposed within the channel, wherein the liner includes a shape that conforms to a generally circular shape of the stump grinder wheel, wherein the liner includes a piece of shock-absorbing or cushioning material that is configured to prevent damage from the stump grinder wheel during transport of the stump grinder; and first and second angled pieces disposed within the channel, the first and second angled pieces forming a receiving space for receiving the stump grinder wheel, wherein the receiving space is generally concave in an upwards direction, wherein the first angled piece limits movement of the stump grinder wheel in a first longitudinal direction relative to the motor vehicle, wherein the second angled piece limits movement of the stump grinder wheel in a second longitudinal direction relative to the motor vehicle, and wherein the first and second angled pieces support the liner.

2. The support assembly of claim 1, wherein the support assembly is attached to a bed of a trailer.

3. The support assembly of claim 1, wherein the first and second angled pieces are welded to the first and second sidewalls and to the base.

4. The support assembly of claim 1, wherein the first and second angled pieces form first and second angles with the base, wherein first and second angles include an angle of 30°-60°.

5. The support assembly of claim 4, wherein the first and second angled pieces form first and second angles with the base, wherein first and second angles include an angle of 40°-50°.

6. The support assembly of claim 1 further wherein:
the first and second sidewalls are welded to the base and to the first and second end-walls; and
the first and second end-walls are welded to the base and to the first and second sidewalls.

7. The support assembly of claim 1 further comprising:
a securing device with a first end and a second end, wherein the first end of the securing device is configured to fasten to the first sidewall and the second end of the securing device is configured to fasten to the second sidewall, the securing device extending around at least a portion of the stump grinder for securing the stump grinder wheel to the support assembly and for minimizing relative motion between the stump grinder wheel and the support assembly, wherein the securing device is configured to hold the stump grinder wheel in the channel of the support assembly and such that a lower portion of the stump grinder wheel is held into contact with the liner.

8. A support assembly for transporting, on a trailer, a stump grinder having a stump grinder wheel, the support assembly comprising:
a base configured to be fastened to a bed of the trailer, wherein the base comprises a generally flat plate, wherein the support assembly is not mounted to the stump grinder;
first and second sidewalls attached to the base, the first and second sidewalls extending perpendicularly upwards from the base, wherein a channel forms an elongated receiving space between the first and second sidewalls;
first and second end-walls attached to the first and second sidewalls and to the base, wherein the first and second end-walls extend perpendicularly to the first and second sidewalls and perpendicularly upwards from the base;

first and second angled pieces disposed within the channel, the first and second angled pieces forming a receiving space for receiving the stump grinder wheel, wherein the receiving space is generally concave in an upwards direction, wherein the first angled piece limits movement of the stump grinder wheel in a first longitudinal direction relative to the trailer, wherein the second angled piece limits movement of the stump grinder wheel in a second longitudinal direction relative to the trailer;

a first notch disposed in the first sidewall; and a second notch disposed in the second sidewall, wherein the first and second notches are aligned to receive the axle on opposite sides of the stump grinder wheel as the stump grinder wheel is inserted into the channel, wherein the first and second notches support the axle in order to limit longitudinal movement of the stump grinder wheel relative to the trailer, wherein the first angled piece limits movement of the stump grinder wheel in a first longitudinal direction relative to the trailer, wherein the second angled piece limits movement of the stump grinder wheel in a second longitudinal direction relative to the trailer.

9. The support assembly of claim 8, wherein the first and second angled pieces are welded to the first and second sidewalls and to the base.

10. The support assembly of claim 8, wherein the first and second angled pieces form first and second angles with the base, wherein the first and second angles include an angle of 30°-60°.

11. The support assembly of claim 8, wherein the first and second angled pieces form first and second angles with the base, wherein the first and second angles include an angle of 40°-50°.

12. The support assembly of claim 8 further wherein:
the first and second sidewalls are welded to the base and to the first and second end-walls; and
the first and second end-walls are welded to the base and to the first and second sidewalls.

13. The support assembly of claim 8 further comprising:
a securing device with a first end and a second end, wherein the first end of the securing device is configured to fasten to at least one of the first sidewall and the first end-wall, the second end of the securing device is configured to fasten to at least one of the second sidewall and the second end-wall, and to extend around at least a portion of the stump grinder for securing the stump grinder wheel to the support assembly and for minimizing relative motion between the stump grinder wheel and the support assembly, wherein the securing device is configured to hold the axle in the first and second notches.

14. The support assembly of claim 8, further comprising:
a liner disposed within the channel, wherein the liner includes a shape that conforms to a generally circular shape of the stump grinder wheel, wherein the liner comprises at least one of a shock-absorbing and cushioning material that is configured to prevent damage from the stump grinder wheel during transport of the stump grinder, wherein the first and second angled pieces support the liner.

15. The support assembly of claim 1, further comprising:
a first notch disposed in the first sidewall; and
a second notch disposed in the second sidewall, wherein the first and second notches comprises arcuate cutouts configured to receive an axle of the stump grinder wheel as the stump grinder wheel is inserted into the channel.

16. The support assembly of claim 15, wherein the first and second notches limit longitudinal movement of the stump grinder wheel relative to the motor vehicle.

17. The support assembly of claim 8, further comprising:
a first notch disposed in the first sidewall; and
a second notch disposed in the second sidewall, wherein the first and second notches comprises arcuate cutouts configured to receive an axle of the stump grinder wheel as the stump grinder wheel is inserted into the channel, wherein the first and second notches limit longitudinal movement of the stump grinder wheel relative to the trailer.

18. A support assembly for transporting, with a motor vehicle, a stump grinder having a stump grinder wheel with an axle, the support assembly comprising:
a base, wherein the support assembly is not mounted to the stump grinder;
first and second sidewalls attached to the base, the first and second sidewalls extending perpendicularly upwards from the base;
first and second end-walls attached to the first and second sidewalls and to the base, wherein the first and second end-walls extend perpendicularly upwards from the base;
a channel formed between the first and second sidewalls, the channel extending from the first end-wall to the second end-wall;
first and second angled pieces disposed within the channel, the first and second angled pieces forming a receiving space for receiving the stump grinder wheel, wherein the first angled piece limits movement of the stump grinder wheel in a first longitudinal direction relative to the trailer, wherein the second angled piece limits movement of the stump grinder wheel in a second longitudinal direction relative to the trailer;
a liner disposed within the channel and supported by the first and second angled pieces, wherein the liner includes a shape that conforms to a generally arcuate shape of the stump grinder wheel, wherein the liner includes a piece of shock-absorbing or cushioning material that is configured to prevent damage from the stump grinder wheel during transport of the stump grinder, wherein the first and second angled pieces support the liner;
a first notch disposed in the first sidewall; and
a second notch disposed in the second sidewall, wherein the first and second notches are aligned to receive the axle on opposite sides of the stump grinder wheel as the stump grinder wheel is inserted into the channel, wherein the first and second notches support the axle in order to limit longitudinal movement of the stump grinder wheel relative to the motor vehicle, wherein the channel is configured to contain a portion of the stump grinder wheel such that approximately a lower half of the stump grinder wheel is positioned in the channel when the axle is in the first and second notches.

* * * * *